United States Patent
Falconer

(10) Patent No.: US 6,843,626 B1
(45) Date of Patent: Jan. 18, 2005

(54) LOAD SUPPORT ASSEMBLY FOR A PICK-UP BED

(76) Inventor: Frederick L. Falconer, 26705 Bouquet Cyn Rd. # 354, Santa Clarita, CA (US) 91350

( * ) Notice: Subject to any disclaimer, the term of this patent is extended or adjusted under 35 U.S.C. 154(b) by 0 days.

(21) Appl. No.: 10/661,126

(22) Filed: Sep. 15, 2003

(51) Int. Cl.[7] .............................. B60P 1/64; B60P 7/15; B60P 7/10
(52) U.S. Cl. ......................... 410/89; 410/143; 410/32
(58) Field of Search ......................... 410/89, 31, 32, 410/44, 77, 78, 85, 121, 129, 140, 143, 151, 153, 156; 296/3, 37.6; 224/403, 404, 405; 206/449; 211/175, 13.1, 28, 49.1

(56) References Cited

U.S. PATENT DOCUMENTS

| | | | |
|---|---|---|---|
| D248,228 S | | 6/1978 | Robertson |
| 4,444,427 A | * | 4/1984 | Martin .......................... 296/43 |
| 5,443,190 A | * | 8/1995 | Cucheran et al. ........... 224/405 |
| 5,741,038 A | | 4/1998 | Fowler et al. |
| 5,871,316 A | | 2/1999 | Bills |
| 6,170,896 B1 | | 1/2001 | Harris et al. |
| 6,196,602 B1 | * | 3/2001 | Esplin ............................ 296/3 |
| 6,206,624 B1 | * | 3/2001 | Brandenburg ................ 410/132 |
| 6,230,340 B1 | * | 5/2001 | Edwards .......................... 5/118 |
| 6,505,764 B2 | | 1/2003 | Vining et al. |
| 2002/0009347 A1 | * | 1/2002 | Stafford ....................... 410/121 |
| 2002/0190534 A1 | * | 12/2002 | Armstrong ..................... 296/3 |
| 2004/0067119 A1 | * | 4/2004 | White ........................ 410/143 |

* cited by examiner

Primary Examiner—D. Glenn Dayoan
Assistant Examiner—H. Gutman

(57) ABSTRACT

A load support assembly for a pick-up bed includes a plurality of elongate members each having a first end, a second end, a bottom surface, a top surface, and a pair of lateral sides. Each of the elongate members has a pair of holes extending therethrough. Each of the holes is positioned adjacent to one of the first and second ends and extending through the lateral sides. The bottom surfaces are selectively positioned on upper edges of side walls of a pick-up bed such that the elongate members traverse the pick-up bed. Each of a plurality of guides is attached to each of the top surfaces of the elongate members such that each of the elongate members has a pair of spaced guides attached thereto. Each of a plurality of fasteners is selectively extendably through aligned ones of the holes and into a toolbox positioned in the pick-up bed.

20 Claims, 4 Drawing Sheets

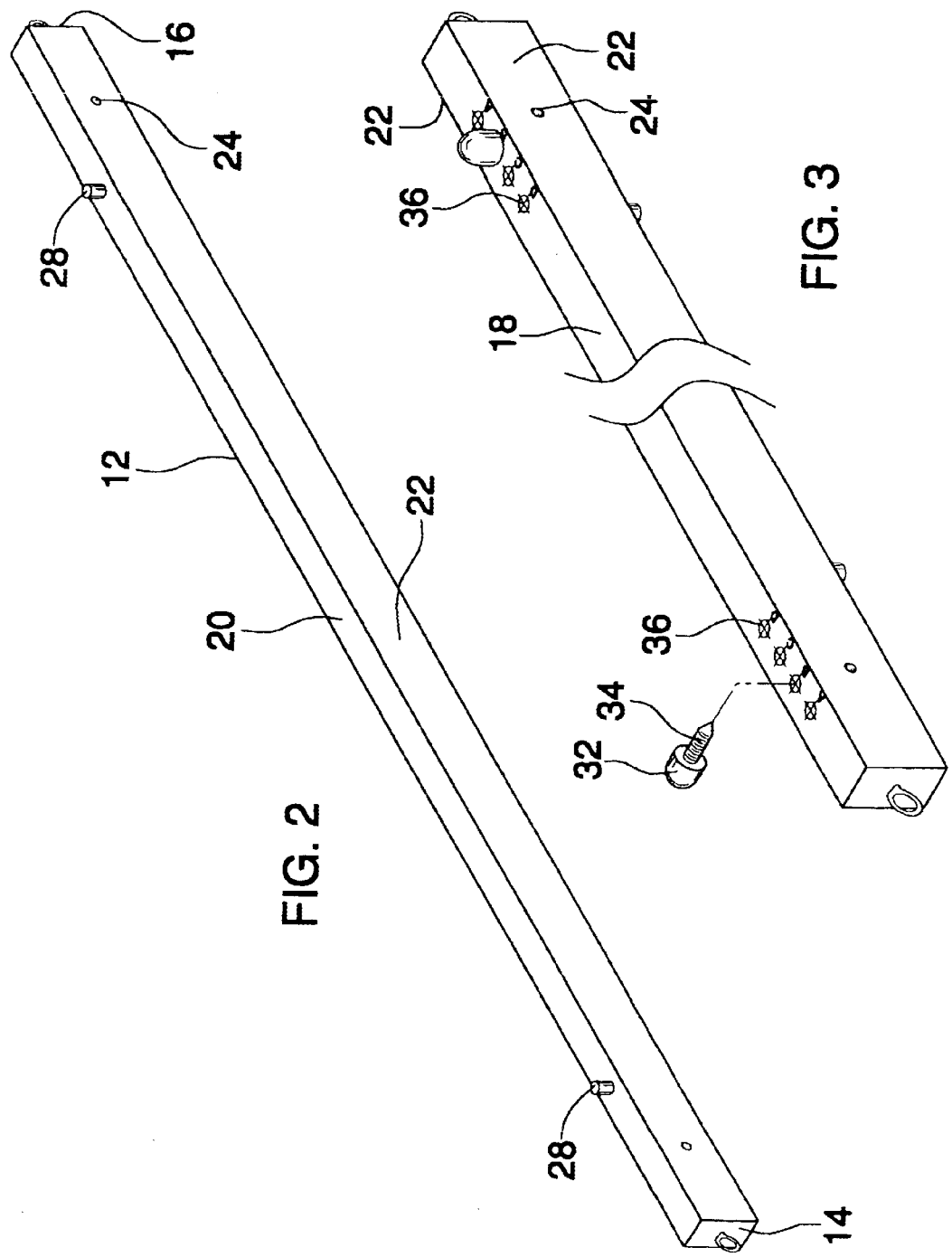

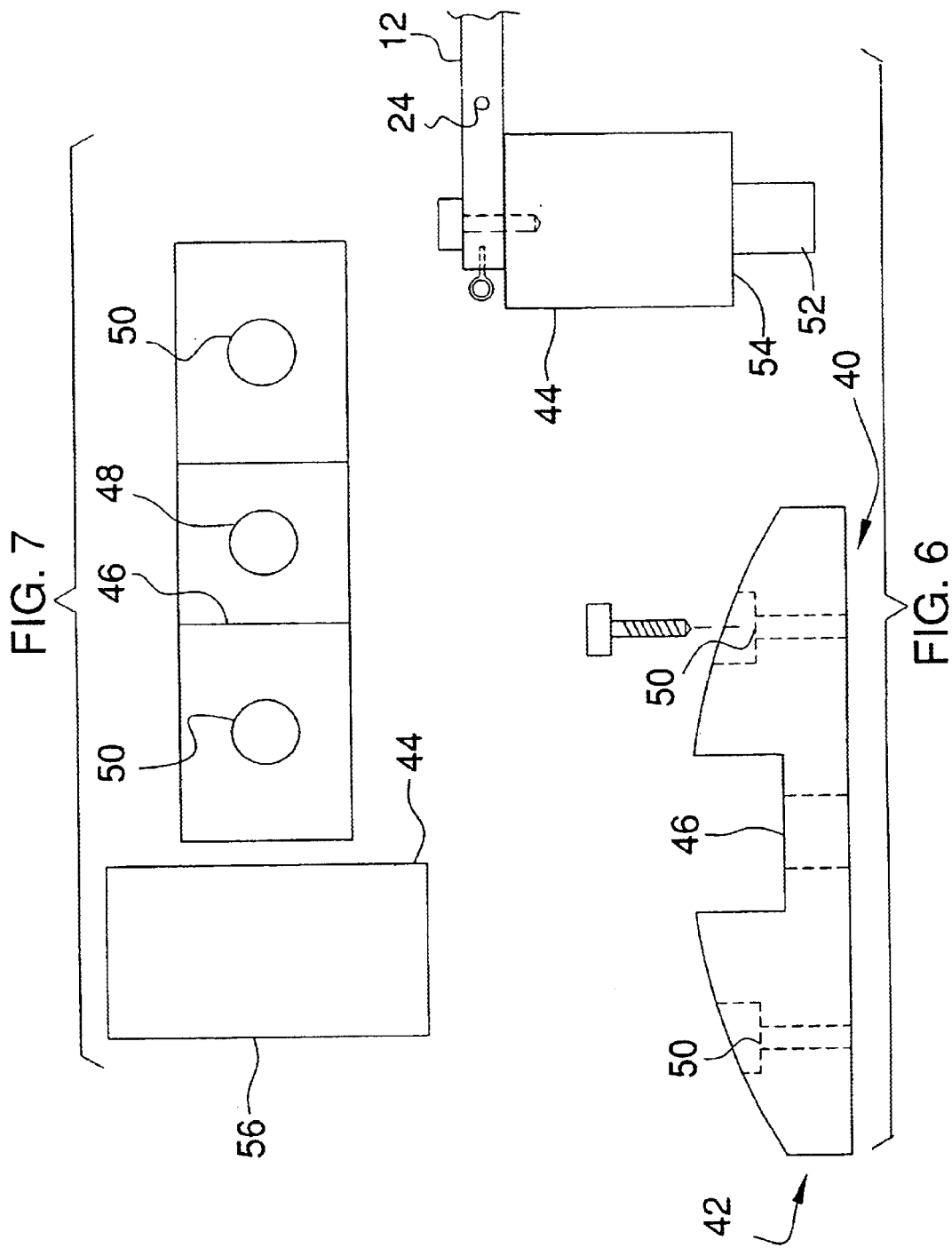

LOAD SUPPORT ASSEMBLY FOR A PICK-UP BED

BACKGROUND OF THE INVENTION

1. Field of the Invention

The present invention relates to pick-up load support devices and more particularly pertains to a new pick-up load support device for supporting oversized and, in particular, elongated loads on short bed pick-up trucks.

2. Description of the Prior Art

The use of pick-up load support devices is known in the prior art. U.S. Pat. No. 6,170,896 describes a device for mounting on the wheel wells of a pick-up truck to form a horizontal support assembly. This device also includes additional mountings for providing additional supports which are substantially level with the wheel wells. Another type of pick-up load support device is U.S. Pat. No. 5,871,316 which includes a plurality of supports which are attachable to the inner surfaces of pick-up walls for forming a horizontal support for holding loads above the wheel wells.

While these devices fulfill their respective, particular objectives and requirements, their general premise lies in the pick-up bed being large enough to hold substantially large panels used for siding and flooring which are often 48" wide and 96" long. These panels are typically drywall, paneling or plywood and it is important to transport them in a substantially horizontal orientation to ensure that the panels are not damages. Typically, short bed pick-ups have less than 48" between the wheel wells and are not deep enough from the front to the back to accept the entire panel. For this reason, the need remains for a device that allows a person transporting such panels to mount the panels above the side walls of the pick-up bed. Such a configuration would also take advantage of conventional cross-over toolboxes that are typically positioned within pick-up beds.

SUMMARY OF THE INVENTION

The present invention meets the needs presented above by generally comprises a plurality of elongate members each having a first end, a second end, a bottom surface, a top surface, and a pair of lateral sides. Each of the elongate members has a pair of holes extending therethrough. Each of the holes is positioned adjacent to one of the first and second ends and extending through the lateral sides. The bottom surfaces are selectively positioned on upper edges of side walls of a pick-up bed such that the elongate members traverse the pick-up bed. Each of a plurality of guides is attached to each of the top surfaces of the elongate members such that each of the elongate members has a pair of spaced guides attached thereto. Each of a plurality of fasteners is selectively extendably through aligned ones of the holes and into a toolbox positioned in the pick-up bed for attaching the elongate members to the toolbox.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic perspective top view of the present invention.

FIG. 3 is a schematic perspective bottom view of the present invention.

FIG. 6 is a schematic side view of a mounting of the present invention.

FIG. 7 is a schematic top view of a mounting of the present invention.

DESCRIPTION OF THE PREFERRED EMBODIMENT

Figure 1:
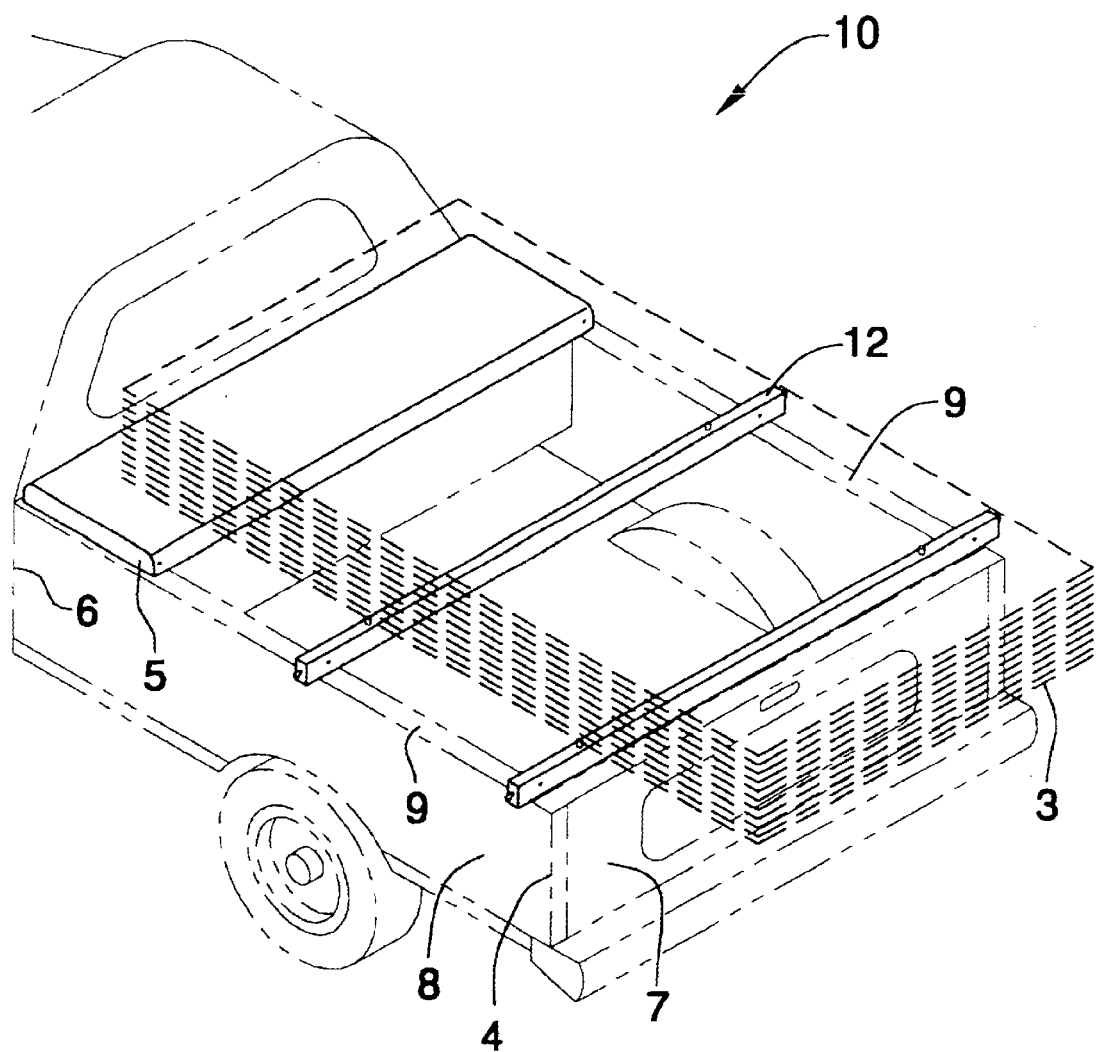
FIG. 1 is a schematic perspective view of a load support assembly for a pick-up bed according to the present invention.
Figure 4:
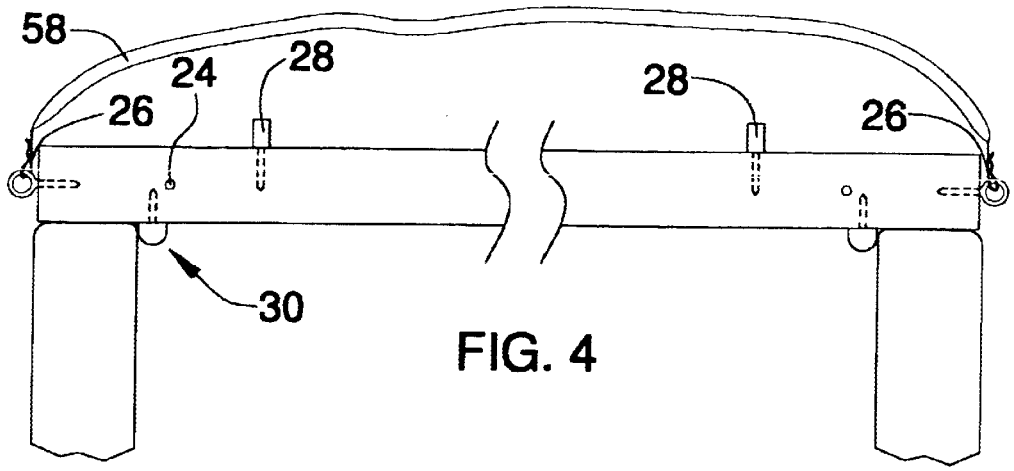
FIG. 4 is a schematic front view of the present invention.
Figure 5:
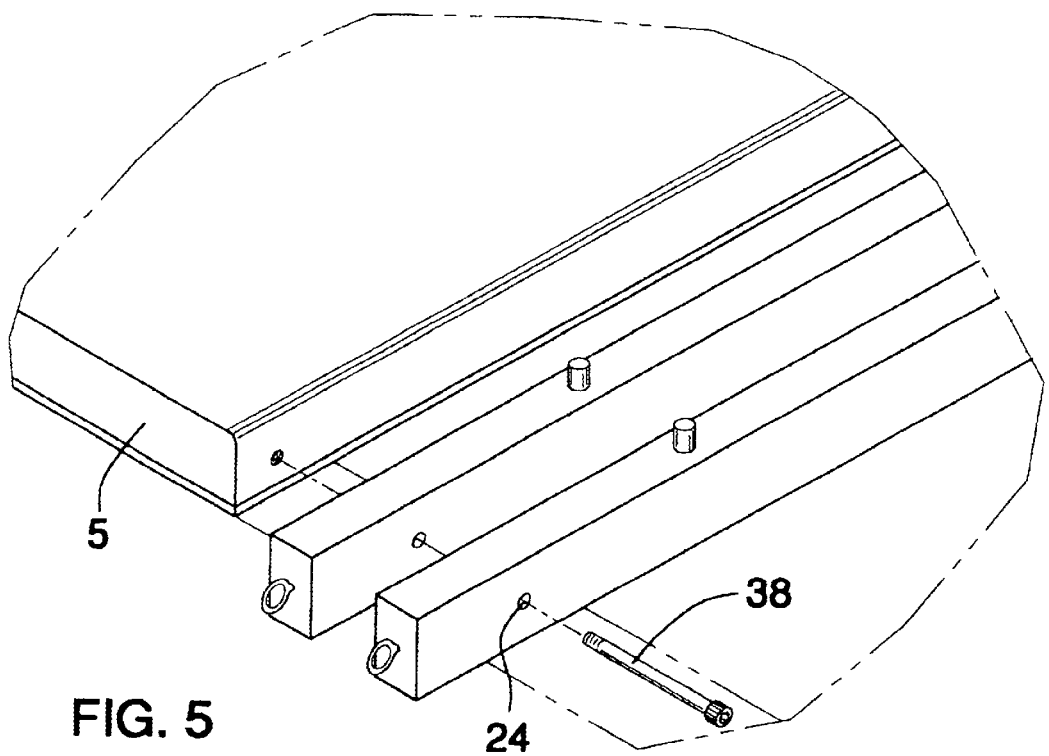
FIG. 5 is a schematic perspective view of the present invention.

With reference now to the drawings, and in particular to FIGS. 1 through 7 thereof, a new pick-up load support device embodying the principles and concepts of the present invention and generally designated by the reference numeral 10 will be described.

As best illustrated in FIGS. 1 through 7, the load support assembly for a pick-up bed is an assembly for positioning on a pick-up bed 4 having a cross-over toolbox 5 positioned therein. The pick-up bed 4 has a rear end 0.6, a front end 7, and a pair of side walls 8. Each of the side walls 8 has an upper edge 9. The cross-over toolbox 4 traverses the pick-up bed 4 and rests on the upper edges 9 of the side walls 8 and is positioned adjacent to the rear end 6.

The assembly generally comprises a plurality of elongate members 12 that each has a first end 14, a second end 16, a bottom surface 18, a top surface 20, and a pair of lateral sides 22. Each of the elongate members 12 has a pair of holes 24 extending therethrough. Each of the holes 24 is positioned adjacent to one of the first 14 and second 16 ends and each extends through the lateral sides 22. The elongate members 12 each have a length greater than sixty inches from the first end 14 to the second end 16, a height generally between two inches and three inches from the bottom surface 18 to the top surface 20, and a width generally between one inch and two inches. Ideally, each of the elongate members 12 has a length equal to sixty four inches. The bottom surfaces 18 are selectively positioned on the upper edges 9 of the side walls 8 such that the elongate members 12 traverse the pick-up bed 4. Preferably, a plurality of loops 26 are provides and each of the loops 26 is selectively coupled to one of the first 14 and second 16 ends of the elongate members.

Each of a plurality of guides 28 is attached to each of the top surfaces 20 of the elongate members 12 such that each of the elongate members 12 has a pair of guides 28 attached thereto. The guides 28 extend upwardly from the top surfaces 20. Ideally, each of the guides 28 of the pair of guides 28 is positioned forty-eight inches apart and each of the guides 28 of the pair of guides 28 is substantially equidistant from the first 14 and second 16 ends of the elongate member 12. This will ensure that the guides 28 one adjacent elongated members 12 are substantially aligned along lines orientated parallel to the side walls 8 of the pick-up bed 4.

Each of a plurality of stabilizers 30 is selectively extendable into each of the bottom surfaces 18 of the elongate members 12 such that each of the elongate members 12 has a pair of stabilizers 30 extended therein. The stabilizers 30 each extend downwardly from the bottom surfaces 18. Each of the stabilizers 30 of the pair of stabilizers is spaced from each other and is positioned such that each of the pair of stabilizers 30 abuts an inner surface of one of the side walls 8 of the pick-up bed 4. The stabilizers 30 help to prevent lateral movement of the elongate members 12 when they are positioned on the upper edges 9 of the side walls 8. Ideally, the stabilizers 30 include a bulbous head portion 32 and a threaded rod 34 that can be extended into the intended bottom surface 18. The bottom surface 18 preferably has aligned indicia markings 36 thereon for aiding the user of the assembly 10 in selecting the positioning of the stabilizers 30 in the elongate members 12. The markings 36 are preferably matched as pairs wherein each the markings 36 in a pair is equidistant from one of the first 14 and second 16 ends of the elongate members 12. This ensures that the stabilizers 30 are equidistant from the first 14 and second 16 ends.

Each of a pair of fasteners 38 is selectively extendably through aligned ones of the holes 24 and into the toolbox 5 for attaching the elongate members 12 to the toolbox 5 to define a storage position of the elongate members 12. The storage position is used to hold the elongate members 12 against the toolbox 5 when they are not being used. This is preferred over positioning the elongate members 12 into the pick-up bed 4 itself as the present assembly is primarily used for short pick-up beds not having enough length and width for transporting oversized panels 3. For that reason, the elongate members 12 will not easily be fitted within the pick-up bed 4 and a storage position is preferred abutting the top edges 9 of the side walls 8.

In use, the elongate members 12 are spaced out as needed along a length of the pick-up bed 4. Ideally, the top surfaces 20 of the elongate members 12 are level with a top surface of the cross-over toolbox 5 so that the toolbox 5 may aid in supporting oversized panel 3 loads. If the toolbox 5 is higher than the elongate members, mounts 40 may be positioned on the upper edges 9 of the side walls 8. The mounts 40 preferably include a base 42 and a plate 44 extending upwardly away therefrom. The bases 42 each have a slot 46 extending downwardly therein. A well 48 is positioned in the slot 46 and a pair of apertures 50 extends through the bases 42 on either side of the slot 46. The apertures 50 receive screws, bolts or other conventional securing members for securing the base 42 onto the top edges 9 of the walls 8. The plates 44 each have a width substantially equal to a width of the slot 46 so that the plate 44 may be extended therein. A post 52 is attached to a bottom side 54 of the plate 44 for extending into the well 48. Nails or other securing members may be extended through elongate members 12 and into a top side 56 of one of the plates 44. When the mounts 40 are used to level the top surfaces 20 with the toolbox 5, the stabilizers 30 are not required as the mounts 40 stabilize the elongate members 12. It should be noted that the assembly 10 may be used without the toolbox 5 and that the toolbox 5 forms no part of the claimed invention. The toolbox 5, however, does add stability when supporting a load and provides an attachment area for the storing of the elongate members 12. If the toolbox 5 is not used, additional elongate members 12 may be used with or without additional mounts 50. Alternatively, elongated members having right-angled bends therein for extending over the sides walls 8, not shown, may be used as a primary support in place of the tool box 5.

Once the elongate members 12 are in position, oversized panels 3 may be positioned on the elongate members 12 and toolbox 5 so that they are supported in a substantially horizontal orientation. The panels 3 are positioned between the guides 28 to prevent their movement on the elongate members 12. Tethers 58, such as cord or rope, may be strung through the loops 26 and wrapped over the panels 3 so that they are secured against the elongate members 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A load support assembly for positioning on a pick-up bed having a cross-over toolbox positioned therein, the pick-up bed having a rear end, a front end, and a pair of side walls, each of the side walls having an upper edge, said assembly comprising:

a plurality of elongate members each having a first end, a second end, a bottom surface, a top surface, and a pair of lateral sides, each of said elongate members having a pair of holes extending therethrough, each of said holes being positioned adjacent to one of said first and second ends, each of said holes extending through said lateral sides, wherein said bottom surfaces are selectively positioned on the upper edges of the side walls such that said elongate members traverse the pick-up bed;

a plurality of guides being attached to each of said top surfaces of said elongate members such that each of said elongate members has a pair of spaced guides attached thereto; and a pair of fasteners, each of said fasteners being selectively extendably through aligned ones of said holes and into the toolbox for attaching said elongate members to the toolbox.

2. The load support assembly of claim 1, wherein each of said elongate members has a length greater than sixty inches from said first end to said second end.

3. The load support assembly of claim 1, wherein each of said elongate members has a length substantially equal to sixty-four inches.

4. The load support assembly of claim 2, wherein each of said elongate members has a height generally between two inches and tree inches from said bottom surface to said top surface, each of said elongate members having a width generally between one inch and two inches.

5. The load support assembly of claim 1, wherein each of said guides of said pair of guides being positioned forty-eight inches apart and being substantially equidistant from said first and second ends of said elongate member.

6. The load support assembly of claim 2, wherein each of said guides of said pair of guides being positioned forty-eight inches apart and being substantially equidistant from said first and second ends of said elongate member.

7. The load support assembly of claim 6, further including a plurality of stabilizers being selectively extendable into each of said bottom surfaces of said elongate members such that each of said elongate members has a pair of stabilizers extended therein, each of said stabilizers extending downwardly from said bottom surfaces, each of said stabilizers of said pair of stabilizer being spaced from each other and being positioned such that each of said pair of stabilizers abuts an inner surface of one of the side walls of the pick-up bed.

8. The load support assembly of claim 1, further including a plurality of stabilizers being selectively extendable into each of said bottom surfaces of said elongate members such that each of said elongate members has a pair of stabilizers extended therein, each of said stabilizers extending downwardly from said bottom surfaces, each of said stabilizers of said pair of stabilizers being spaced from each other and being positioned such that each of said pair of stabilizers abuts an inner surface of one of the side walls of the pick-up bed.

9. The load support assembly of claim 7, further including a plurality of loops, each of said loops being selectively coupled to one of said first and second ends of said elongate members.

10. The load support assembly of claim 1, further including a plurality of loops, each of said loops being selectively coupled to one of said first and second ends of said elongate members.

11. A load support assembly for positioning on a pick-up bed having a cross-over toolbox positioned therein, the pick-up bed having a rear end, a front end, and a pair of side walls, each of the side walls having an upper edge, said assembly comprising:

a plurality of elongate members each having a first end, a second end, a bottom surface, a top surface, and a pair of lateral sides, each of said elongate members having a pair of holes extending therethrough, each of said holes being positioned adjacent to one of said first and second ends, each of said holes extending through said lateral sides, each of said elongate members having a length greater than sixty inches from said first end to said second end, each of said elongate members having a height generally between two inches and three inches from said bottom surface to said top surface, each of said elongate members having a width generally between one inch and two inches, wherein said bottom surfaces are selectively positioned on the upper edges of the side walls such that said elongate members traverse the pick-up bed;

a plurality of guides being attached to each of said top surfaces of said elongate members such that each of said elongate members has a pair of guides attached thereto, each of said guides extending upwardly from said top surfaces, each of said guides of said pair of guides being positioned forty-eight inches apart and being substantially equidistant from said first and second ends of said elongate member;

a plurality of stabilizers being selectively extendable into each of said bottom surfaces of said elongate members such that each of said elongate members has a pair of stabilizers extended therein, each of said stabilizers extending downwardly from said bottom surfaces, each of said stabilizers of said pair of stabilizers being spaced from each other;

a pair of fasteners, each of said fasteners being selectively extendably through aligned ones of said holes and into the toolbox for attaching said elongate members to the toolbox to define a storage position of said elongate members; and a plurality of loops, each of said loops being selectively coupled to one of said first and second ends of said elongate members.

12. The load support assembly of claim 11 further including a plurality of mounts for positioning said elongate members above and spaced from the top edges of the side walls.

13. The load support assembly of claim 12, wherein each of said mounts preferably includes a base and a plate extending upwardly away therefrom, each of said bases having a slot extending downwardly therein, each of said slots having a well extending therein, each of said bases having a pair of apertures extending therethrough and positioned on either side of said slot, wherein the apertures may removably receive securing members for securing said base onto the top edges of the walls, each of the plates having a width substantially equal to a width of said slot so that said plate may be extended therein, each of a plurality of posts being attached to a bottom side of each of said plates for extending into the well, securing members being extendable through said elongate members and into a top side of one of the plates such that said elongate members traverse the pick-up bed.

14. A load support assembly for positioning on a pick-up bed, the pick-up bed having a rear end, a front end, and a pair of side walls, each of the side walls having an upper edge, said assembly comprising:

a plurality of elongate members each having a first end, a second end, a bottom surface, a top surface, and a pair of lateral sides, each of said elongate members having a pair of holes extending therethrough, each of said holes being positioned adjacent to one of said first and second ends, each of said holes extending through said lateral sides;

a plurality of guides being attached to each of said top surfaces of said elongate members such that each of said elongate members has a pair of spaced guides attached thereto;

a pair of fasteners, each of said fasteners being selectively extendably through aligned ones of said holes; and a plurality of mounts for positioning said elongate members above and spaced from the top edges of the side walls such that said elongate members traverse the pick-up truck bed.

15. The load support assembly of claim 14, wherein each of said mounts preferably includes a base and a plate extending upwardly away therefrom, each of said bases having a slot extending downwardly therein, each of said slots having a well extending therein, each of said bases having a pair of apertures extending therethrough and positioned on either side of said slot, wherein the apertures may removably receive securing members for securing said base onto the top edges of the walls, each of the plates having a width substantially equal to a width of said slot so that said plate may be extended therein, each of a plurality of posts being attached to a bottom side of each of said plates for extending into the well, securing members being extendable through said elongate members and into a top side of one of the plates such that said elongate members traverse the pick-up bed.

16. The load support assembly of claim 15, wherein each of said elongate members has a length greater than sixty inches from said first end to said second end.

17. The load support assembly of claim 16, wherein each of said guides of said pair of guides being positioned forty-eight inches apart and being substantially equidistant from said first and second ends of said elongate member.

18. The load support assembly of claim 16, further including a plurality of loops, each of said loops being selectively coupled to one of said first and second ends of said elongate members.

19. The load support assembly of claim 15, further including a plurality of loops, each of said loops being selectively coupled to one of said first and second ends of said elongate members.

20. The load support assembly of claim 14, fixer including a plurality of loop; each of said loops being selectively coupled to one of said first and second ends of said elongate members.

* * * * *